United States Patent [19]

Silvestri, Jr.

[11] Patent Number: 5,061,431
[45] Date of Patent: Oct. 29, 1991

[54] METHOD OF DETERMINING THE ENTHALPY AND MOISTURE CONTENT OF WET STEAM

[75] Inventor: George J. Silvestri, Jr., Winter Park, Fla.

[73] Assignee: Westinghouse Electric Corp., Pittsburgh, Pa.

[21] Appl. No.: 401,671

[22] Filed: Sep. 1, 1989

[51] Int. Cl.$^5$ .............................................. G21C 17/00
[52] U.S. Cl. .................................. 376/252; 376/245; 376/247; 376/241
[58] Field of Search .............. 376/245, 247, 252, 241; 60/646, 657; 374/31; 364/509

[56] References Cited

U.S. PATENT DOCUMENTS 3,991,603  11/1976  Wonn et al. .............................. 73/29

OTHER PUBLICATIONS

McClintock & Silvestri; "Calculations of Properties of Steam"; ASME Article, Library of Congress Catalog No. 68-22685; pub. 1968.

ASME Committee on Properties of Steam; "Thermodynamic and Transport Properties of Steam"; Fourth Edition of the ASME Proceedings; pub. 1968.

*Primary Examiner*—Brooks H. Hunt
*Assistant Examiner*—Meena Chelliah

[57] ABSTRACT

A simple and accurate method for determining the enthalpy of wet steam using pressure and moisture content values. Moisture content is determined by measuring sonic velocity of the steam, which is dependent upon enthalpy. A small sample of the wet steam is superheated by pressure reduction to a single-phase state prior to measuring its sonic velocity in order to achieve greater accuracy of this measurement. From its sonic velocity, enthalpy of the sample is calculated. Since the process takes place at constant enthalpy, the enthalpy value of the sample is the same as that of the fluid from which it was drawn.

8 Claims, 1 Drawing Sheet

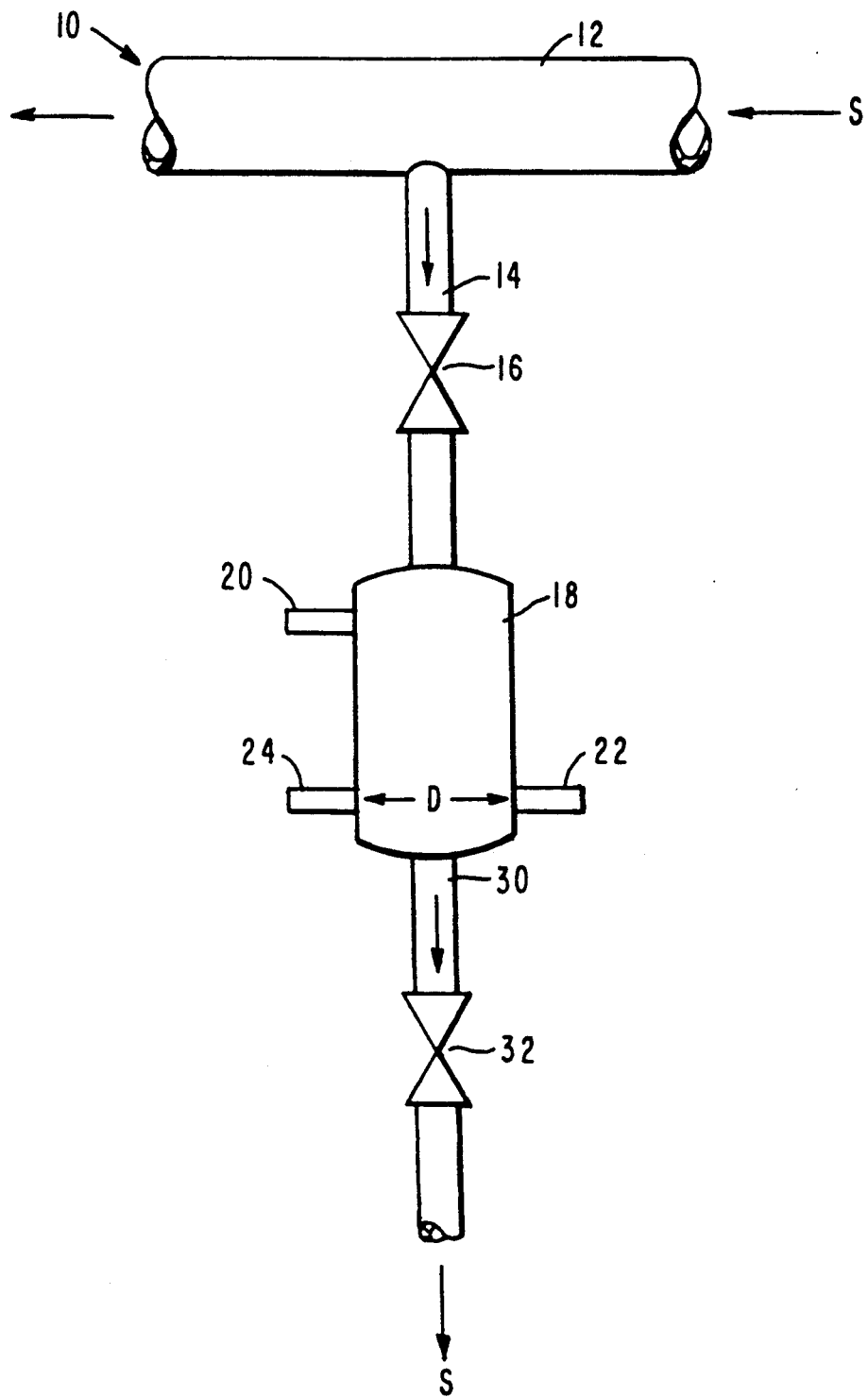

METHOD OF DETERMINING THE ENTHALPY AND MOISTURE CONTENT OF WET STEAM

This invention relates to steam turbine electrical power generating systems and, more particularly, to a method for increasing the available output power of a nuclear power steam turbine system by more precise measurement of the turbine power level.

Unlike the operation of fossil fuel powered steam turbine plants, the power output produced by nuclear powered steam turbine plants is limited by regulatory requirements rather than equipment limitations. The Nuclear Regulatory Commission (NRC) licenses a maximum power level for a nuclear steam supply system, hereinafter referred to as "NSSS". Because of the low cost of fuel for an NSSS, utilities strive to operate their plants at the maximum licensed NSSS power level.

Calorimetrics is the general term applied to the procedure for measurement of NSSS power output, such power output being measured at specific intervals. On the turbine portion of the NSSS, power is computed by determining mass flow in and out of the system as well as the energy levels or enthalpies of the various fluid streams. The measurement of this NSSS power output is complicated by the fact that the steam leaving the NSSS is actually a steam water, two-phase fluid which contrasts with the dry steam leaving fossil fuel steam supply systems. The presence of moisture in the NSSS reduces its enthalpy or energy level, turbine efficiency, and turbine output. The energy level of the fluid cannot be determined simply by measuring the pressure and temperature as the temperature does not vary with change in the liquid-vapor ratio. In order to determine the enthalpy of the two-phase liquid, it is necessary to measure the moisture content and either the pressure or the temperature of the fluid. The procedures currently in use for measuring enthalpy have various inaccuracies and uncertainties. Consequently, the Nuclear Regulatory Commission allows the operating power level of an NSSS to exceed the licensed output by a specified amount to allow for such uncertainties.

It has been noted that deficiencies or degradation of turbine output occur over time. Efforts to determine the cause of such degradation have generally focused on errors in the mass flow determination of the turbine portion of the cycle. Turbine stage pressure monitoring provides a comparatively reliable indication of mass flow. However, turbine stage pressures in the turbine-condenser-feedwater heater system also vary with, for example, seal wear, steam moisture content, blading deposits, and leaking valves in the turbine-condenser-feedwater heater system.

Some utilities use a calibrated flow nozzle to verify mass flow in the condensate system. The inspection capability of the flow nozzle includes a window or inspection port which allows visual inspection for build-ups of deposits in the nozzle which may cause flow measurement errors. However, if the flow measurement is correct, the NSSS output and, consequently, the turbine output may still be in error due to uncertainty of the steam enthalpy supplied to the turbine, which is, in turn, due to uncertainty of the moisture content.

Previously, calculations have been made to determine how much the turbine output would decrease if turbine inlet moisture was higher than design value. In one set of comparisons, the NSSS mass flow was maintained at a constant level (corresponding to design conditions at licensed power output) and the steam moisture content was varied. In a second study, it was observed that, due to an increase in moisture content, mass flow increased while enthalpy decreased. The following tables illustrate data obtained from the aforementioned studies:

| I. Turbine Output at Constant Mass Flow, Variable Moisture | | | |
|---|---|---|---|
| Moisture Level % | Mass Flow Lb/Hr | Megawatts Thermal MWT | Turbine Output MW |
| 0.25 | 12,203,200 | 2785.2 | 939.2 |
| 0.85 | 12,203,200 | 2772.4 | 933.7 |
| 1.25 | 12,203,200 | 2763.9 | 930.2 |

| II. Turbine Output at Constant NSSS Output, Variable Moisture | | | |
|---|---|---|---|
| Moisture Level % | Mass Flow Lb/Hr | Megawatts Thermal MWT | Turbine Output MW |
| 0.25 | 12,203,200 | 2785.2 | 939.2 |
| 0.85 | 12,268,200 | 2785.2 | 938.1 |
| 1.25 | 12,311,400 | 2785.2 | 937.5 |

The data above shows that with constant mass flow, the loss in output is 0.57% for a 0.6% increase in moisture, and is 0.95% for a 1.0% increase in moisture. However, if mass flow is increased to achieve maximum NSSS output, the loss in turbine output is only 0.09% for a 0.6% increase in moisture, and 0.16% for a 1.0% increase in moisture. Accordingly, it is necessary to determine the enthalpy of the steam entering the turbine from the NSSS in order to adjust the mass flow. Adjusting the mass flow, in this manner, compensates for variations in moisture levels and maintains NSSS output at the maximum allowable level.

In the past, radioactive and non-radioactive tracers have been used to determine the level of moisture in turbine supply steam. These procedures are disadvantageous for many reasons including: plant chemistry limitations; special radioactivity protection requirements; unmanageability; and uncertainty. A need therefore exists for an accurate and simple method for determining enthalpy of turbine supply steam.

SUMMARY OF THE INVENTION

It is an object of the present invention to provide a simple and accurate method to determine the enthalpy of wet steam using pressure and moisture content measurements. Moisture content is determined by measuring sonic velocity in wet steam which is enthalpy and, to a lesser extent, pressure dependent. A small sample of the wet steam is superheated by pressure-reduction to a single phase state prior to making the measurements in order to achieve greater accuracy. From the measured sonic velocity, enthalpy of the sample is calculated. Since the process takes place at constant enthalpy, the enthalpy of the sample is the same as that of the fluid from which it was drawn. Given the enthalpy and steam supply pressure, the throttle moisture level can be determined which allows more accurate determination of power level. Mass flow can then be adjusted to achieve the described maximum NSSS output.

BRIEF DESCRIPTION OF THE DRAWING

For a better understanding of the present invention, reference may be had to the following detailed description taken in conjunction with the accompanying drawing in which:

FIG. 1 is a schematic diagram of the method and devices of the present invention.

DETAILED DESCRIPTION OF THE PREFERRED EMBODIMENT

As illustrated in FIG. 1, the present invention may be implemented in a system 10 by tapping a steam conduit 12 with a small sampling pipeline 14. In order to accurately measure the enthalpy of supply steam taken from between the NSSS and the turbine, it is desirable to extract the sample from as close to the turbine as possible since heat loss occurs in the conduit 12. The pressure of this steam sample is reduced by a throttling valve 16. The reason for reducing this pressure relates to measurement inaccuracies of sonic velocity through a two-phase fluid. These inaccuracies may be due to droplet size effects, non-equilibrium effects, and/or other variables. The following table demonstrates that when throttled steam is in a superheated phase, there is little pressure dependence of the sonic velocity and strong enthalpy dependence.

| III. Sonic Velocities of Steam of Varying Moisture Content, After Throttling | | | | | |
|---|---|---|---|---|---|
| Initial Pressure Psia | Enthalpy Btu/Lb | Initial Moisture % | Sonic Velocity Pressure Level | | |
| | | | 100 psia | 50 psia | 25 psia |
| 964 | 1192.59 | .25 | 1649.4 | 1652.0 | 1653.3 |
| 964 | 1188.64 | .85 | 1640.6 | 1643.1 | 1644.2 |
| 964 | 1186.01 | 1.25 | 1530.8 | 1637.1 | 1638.2 |

With an enthalpy of 1186.01 Btu/Lb, the steam is still wet when throttled to 100 psia but is superheated at 50 psia and 25 psia. An absolute increase in moisture of 0.6% results in a 0.55% change in sonic velocity while an absolute 1% change in moisture results in a 0.91% change in sonic velocity.

A small sample of steam is allowed to flow through pipeline 14, through measuring chamber 18, and is then discharged at discharge line 30 to a lower pressure point. Chamber 18 is equipped with a transducer 20 for measuring pressure within chamber 18. A sound wave is generated from transmitter 22, and is detected by receiver 24 placed opposite transmitter 22 at a known distance D. The elapsed time t for the sound wave to travel from transmitter 22 to receiver 24 is measured. The sonic velocity is calculated according to the formula $V = D/t$. The enthalpy of the steam within the chamber is calculated from the sonic velocity, pressure and chamber volume based upon the relationship:

$$c = \sqrt{\frac{dp}{1/dv}},$$

where c is critical velocity, i.e., sonic velocity in a single phase fluid, dp is the partial derivative of pressure and dv is the partial derivative of volume. The process for calculating critical velocity is described in an ASME article entitled "Calculations of Properties of Steam", by McClintock and Silvestri, published 1968, Library of Congress Catalog No. 68-22685. In general, an iterative process is preferred to evaluate the critical velocity and a computer program for such process is set forth in the article. The process of determining the enthalpy value, using iteration, requires assuming an enthalpy value and computing, from the assumed value, a critical velocity. If the computed velocity differs from the measured velocity, another enthalpy is assumed and then repeated until the computed value substantially equals the measured value. The assumed enthalpy value for equality is the correct value. The value of enthalpy as a function of critical velocity is set forth for water-steam mixtures and for superheated steam in published steam graphs. See, for example, the ASME Steam Tables from the Fourth Edition of the ASME proceedings on "Thermodynamic and Transport Properties of Steam", prepared by the ASME Committee on Properties of Steam and published in 1968. The reduction in pressure accomplished by throttling valve 14 takes place at constant enthalpy, which means that the enthalpy of the steam in conduit 12 is the same as the enthalpy of the measured sample. Using this calculated enthalpy value and the pressure level of the steam within conduit 12, it is then possible to calculate its moisture content. These values can then be used to calculate NSSS output for the purpose of making mass flow adjustments to achieve actual maximum licensed NSSS output. Correction curves for varying moisture levels are supplied by turbine vendors for use in making mass flow adjustments to maximize turbine output.

The foregoing procedure with certain modifications can also be used to determine wetness of steam extracted for feedwater heating or of steam exhausted from the high pressure turbine stage (H.P. section). Since wetness of the steam leaving the first H.P. extraction is about 8% at 390 psia, it would be necessary to throttle the steam to about 4 psia to superheat it. H.P. exhaust wetness, which has a moisture level of about 11.6% at 215 psia, would require throttling to 0.3 psia. Since the latter is lower than condenser pressure, a vacuum pump or steam ejector would be needed to raise the throttled steam to condenser pressure level, requiring a greater volume of steam and greater size of measuring chamber. The following modifications obviate these requirements.

The steam sample would be led through pipeline 14 into the measuring chamber 18, and discharged through discharge line 30 to a lower pressure point, as in the first described procedure. After sufficient warming of the apparatus, discharge line 30 is closed by valve 32, and valve 16 is also closed, bottling the steam sample within chamber 18. The steam is converted from a steady flow state to a non-flow state, thereby converting the flow work of the steam into internal energy and raising its temperature. The process is described by the following equations:

$$h_1 = U_1 + P_1 V_1/J = U_2$$

where $h_1$ equals steam enthalpy, $U_1$ equals internal energy of flow state, $P_1 V_1/J$ equals flow work, and $U_2$ equals internal energy of non-flow state.

The following tables show the enthalpy and internal energy of saturated steam at a number of pressure levels:

| Pressure psia | Enthalpy h | Flow Work | Internal Energy |
|---|---|---|---|
| 10 | 1143.4 | 71.1 | 1072.3 |
| 20 | 1156.3 | 74.4 | 1081.9 |
| 30 | 1164.2 | 76.3 | 1087.9 |
| 50 | 1174.1 | 78.8 | 1195.3 |
| 100 | 1187.2 | 82.0 | 1105.2 |
| 964 | 1194.3 | 82.9 | 1111.4 |

The following table presents the pressures and enthalpy at the first H.P. extraction point and also the H.P. exhaust, as turbine inlet wetness was increased from 0.25% to 0.85% and to 1.25%.

| First Extraction | | H.P. Extraction | |
|---|---|---|---|
| P | h | P | h |
| 392.6 | 1139.4 | 214.5 | 1101.8 |
| 391.1 | 1135.8 | 213.5 | 1098.5 |
| 390.1 | 1133.3 | 212.8 | 1096.2 |

If the first extraction point steam were throttled to 100 psia, and then bottled up in the tank, its internal energy would be in the 1133.3 Btu/Lb to 1139.4 Btu/Lb range, which is considerably above the internal energy of saturated steam at 100 psia, which is 1105.2 Btu/Lb. Thus, it would be superheated to a single-phase state. By measuring its sonic velocity and pressure, the energy level of the steam at the extraction point can be determined in the same way as the first procedure described herein, supra.

For H.P. exhaust steam, the energy level at 100 psia is too low for the steam to become superheated. At 30 psia, however, the steam would have sufficient superheat in the non-flow condition.

Because of its low comparative wetness, the sonic velocity of turbine inlet steam should be measured in a steady flow condition with the discharge line 30 open. Because of the low wetness and the high pressure, moisture droplet size will be small and a representative fluid sample can be obtained.

In the case of H.P. extraction steam or H.P. exhaust steam, the wetness is high and it is difficult to obtain a representative fluid sample. In this instance, the measurements would be used to obtain a relative change in operating conditions rather than an absolute level of enthalpy. The alternative procedure described will best serve to measure enthalpy of the wetter steam. The latter procedure is also suitable for measuring wetness at various stages of an L.P. turbine element.

The foregoing descriptions and schematic representation shown in the drawing are exemplary and do not exhaust the possibilities of alternative methods employing the measurement of sonic velocity to determine enthalpy and moisture content of steam. Many modifications may be devised by those skilled in the art, and it is to be understood that the claims herein are intended to cover all such modifications that fall within the true spirit and scope of this invention.

What is claimed is:

1. A method of determining enthalpy of source steam in a steam turbine system wherein a source delivers steam at a pressure higher than atmospheric pressure through inlet piping to a turbine element, the method comprising the steps of:
    sampling a small quantity of source steam from said inlet piping;
    reducing the pressure of said steam sample at constant enthalpy to a superheated state;
    passing the steam sample through a measuring chamber;
    measuring the pressure of the steam sample flowing through the chamber;
    sending a sound wave from a transmitter through the steam flowing through the chamber to a receiver located at a known distance from the transmitter;
    determining sonic velocity in the steam sample flowing through the chamber by measuring the time required for the sound wave to travel from transmitter to receiver; and
    utilizing the measured pressure and sonic velocity in the steam flowing in the chamber to calculate the enthalpy of the source steam.

2. In a steam turbine system wherein single phase steam enters the turbine system at a pressure greater than atmospheric pressure and exits the turbine system at one or more points of pressure lower than the entering pressure, a method of determining moisture content and enthalpy of steam at a selected point within the system comprising the steps of:
    sampling a small quantity of steam from the selected point within the turbine system;
    measuring the pressure and sonic velocity of said steam sample; and
    utilizing the measured pressure and sonic velocity of the steam sample to calculate the moisture content and enthalpy of the steam at the selected point.

3. The method according to claim 2 further comprising the step of superheating the steam sample to a single-phase state prior to measuring its pressure and sonic velocity.

4. The method according to claim 3 wherein the step of superheating the steam sample to a single-phase state comprises reducing the pressure of the sample.

5. The method according to claim 4 wherein the step of measuring the sonic velocity of the steam sample comprises passing a sound wave from a transmitter through the steam sample to a receiver located at a known distance from the transmitter and measuring the time required for the sound wave to travel from transmitter to receiver.

6. The method according to claim 3 wherein the step of superheating the steam sample comprises reducing its pressure and bottling it in a closed chamber whereby the flow energy of the sample is converted into internal energy.

7. The method according to claim 6 wherein the step of measuring the sonic velocity of the steam sample comprises passing a sound wave from a transmitter through the steam sample to a receiver located at a known distance from the transmitter and measuring the time required for the sound wave to travel from transmitter to receiver.

8. In a nuclear powered multi-stage steam turbine system wherein steam at higher than atmospheric pressure is introduced into the turbine system at a high pressure turbine element and thereafter flows through a series of turbine elements at successively decreasing pressures, wherein portions of said steam are extracted from the turbine elements at a plurality of lower pressure points and said steam is finally exhausted at a lowest pressure point, the method of determining moisture content and enthalpy of steam at a selected pressure point comprising the steps of:

sampling a small quantity of steam at the selected pressure point;

superheating the steam sample to a single-phase state by reducing its pressure and bottling it in a closed measuring chamber whereby the flow energy of the sample is converted into internal energy;

measuring the pressure of said steam sample within the chamber;

determining the sonic velocity of the steam sample by passing a sound wave through the sample from a transmitter to a receiver located at a known distance from said transmitter and measuring the time required for the sound wave to travel from transmitter to receiver; and utilizing the measured pressure and sonic velocity of the steam sample to calculate the moisture content and enthalpy of the steam at the selected pressure point.

* * * * *